(12) United States Patent
Pahuja et al.

(10) Patent No.: US 12,587,837 B2
(45) Date of Patent: Mar. 24, 2026

(54) SECURE BROADCAST FROM ONE TO MANY DEVICES

(71) Applicant: iBiquity Digital Corporation, Columbia, MD (US)

(72) Inventors: Ashwini Pahuja, Roslyn Heights, NY (US); Catherine P. Gooi, Jersey City, NJ (US); Gabriel Olochwoszcz, Hillsborough, NJ (US); Marek Milbar, Huntingdon Valley, PA (US)

(73) Assignee: iBiquity Digital Corporation, Columbia, MD (US)

( * ) Notice: Subject to any disclaimer, the term of this patent is extended or adjusted under 35 U.S.C. 154(b) by 339 days.

(21) Appl. No.: 18/030,930

(22) PCT Filed: Oct. 7, 2021

(86) PCT No.: PCT/US2021/071776
§ 371 (c)(1),
(2) Date: Apr. 7, 2023

(87) PCT Pub. No.: WO2022/077019
PCT Pub. Date: Apr. 14, 2022

(65) Prior Publication Data
US 2024/0235709 A1 Jul. 11, 2024

Related U.S. Application Data

(60) Provisional application No. 63/090,189, filed on Oct. 10, 2020.

(51) Int. Cl.
*G16Y 10/70* (2020.01)
*G06F 8/65* (2018.01)
(Continued)

(52) U.S. Cl.
CPC .............. *H04W 12/03* (2021.01); *G06F 8/65* (2013.01); *G16Y 10/70* (2020.01); *H04H 60/06* (2013.01);
(Continued)

(58) Field of Classification Search
None
See application file for complete search history.

(56) References Cited

U.S. PATENT DOCUMENTS 11,917,412 B2 2/2024 Tsiatsis et al.
2003/0084108 A1 5/2003 Syed
(Continued)

FOREIGN PATENT DOCUMENTS

CN 110460958 A 11/2019
EP 3375148 A1 9/2018
(Continued)

OTHER PUBLICATIONS

International Search Report for Application No. PCT/US2021/054027 mailed Feb. 4, 2022. 4 pgs.
(Continued)

*Primary Examiner* — Idowu O Osifade
(74) *Attorney, Agent, or Firm* — Lerner David LLP

(57) ABSTRACT

A method of controlling operation of an end device using a one-way radio broadcast includes sending an encrypted message from a client application of a computing device to a first network server, sending the encrypted message from the first network server to a second server included with radio broadcast automation equipment, transmitting the encrypted message in a radio broadcast signal using one or more radio broadcast transmitters, receiving the radio broadcast signal at an end device, and decrypting the encrypted
(Continued)

message using the end device. The encrypted message includes control information to control operation of the end device.

21 Claims, 10 Drawing Sheets

(51) Int. Cl.

| | |
|---|---|
| *H04H 60/06* | (2008.01) |
| *H04H 60/09* | (2008.01) |
| *H04H 60/13* | (2008.01) |
| *H04W 12/03* | (2021.01) |
| *H04W 12/037* | (2021.01) |
| *H04W 60/00* | (2009.01) |

(52) U.S. Cl.
CPC ............ *H04H 60/09* (2013.01); *H04H 60/13* (2013.01); *H04W 12/037* (2021.01); *H04W 60/00* (2013.01)

(56) References Cited

U.S. PATENT DOCUMENTS

| | | |
|---|---|---|
| 2003/0214924 A1 | 11/2003 | Kim et al. |
| 2006/0020965 A1 | 1/2006 | Steelberg et al. |
| 2018/0270895 A1 | 9/2018 | Park et al. |
| 2018/0324740 A1 | 11/2018 | Edge et al. |
| 2018/0359811 A1 * | 12/2018 | Verzun ................... H04L 12/28 |
| 2019/0174449 A1 | 6/2019 | Shan et al. |
| 2019/0349709 A1 * | 11/2019 | Kim ........................ H04W 4/50 |
| 2020/0008044 A1 | 1/2020 | Poornachandran et al. |
| 2020/0092727 A1 | 3/2020 | Basu Mallick et al. |
| 2020/0120458 A1 * | 4/2020 | Aldana ................. H04W 28/22 |
| 2021/0067958 A1 | 3/2021 | Lee et al. |
| 2022/0150714 A1 | 5/2022 | Yoneyama et al. |
| 2022/0201638 A1 | 6/2022 | Arrobo Vidal et al. |

FOREIGN PATENT DOCUMENTS

| | | |
|---|---|---|
| JP | 2008-278383 A | 11/2008 |
| KR | 2003-0088825 A | 11/2003 |
| KR | 20180117934 A | 10/2018 |
| WO | 2014/134670 A1 | 9/2014 |
| WO | 2017081492 A1 | 5/2017 |
| WO | 2020/175018 A1 | 9/2020 |
| WO | 2021/018205 A1 | 2/2021 |

OTHER PUBLICATIONS

International Search Report for Application No. PCT/US2021/071776 mailed Feb. 7, 2022. 3 pgs.
Hamamreh, Jehad M., Haji M. Furqan, and Huseyin Arslan. "Classifications and applications of physical layer security techniques for confidentiality: A comprehensive survey." IEEE Communications Surveys & Tutorials 21.2 (2018): 1773-1828. (Year: 2018).

* cited by examiner

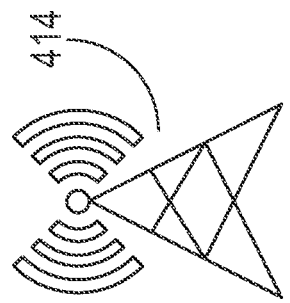
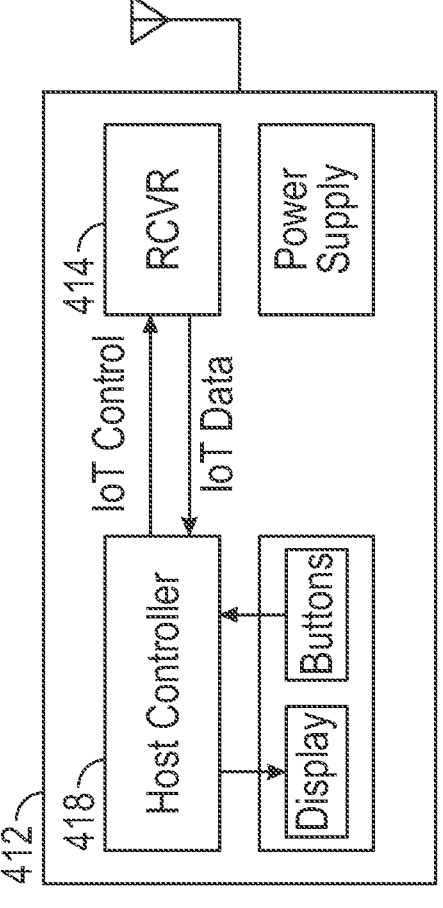
FIG. 4

600

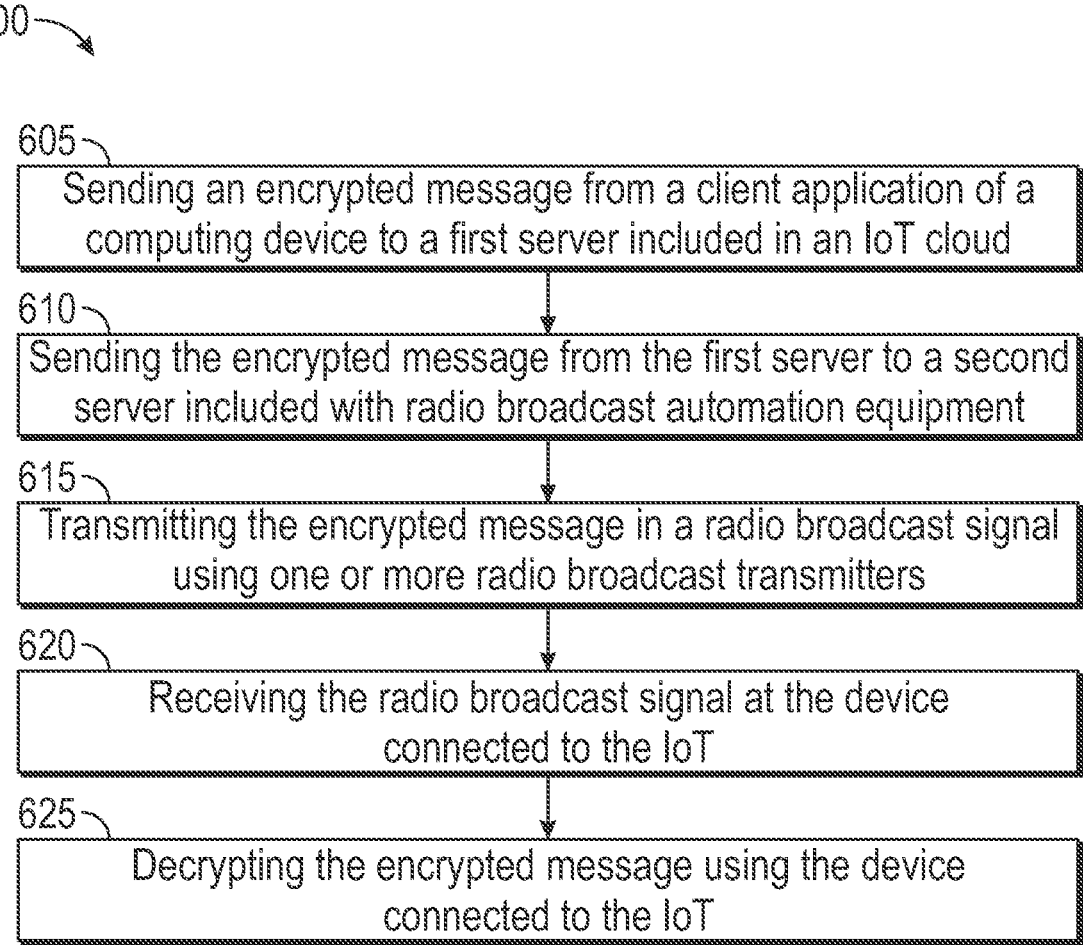

605
Sending an encrypted message from a client application of a computing device to a first server included in an IoT cloud 610
Sending the encrypted message from the first server to a second server included with radio broadcast automation equipment 615
Transmitting the encrypted message in a radio broadcast signal using one or more radio broadcast transmitters 620
Receiving the radio broadcast signal at the device connected to the IoT 625
Decrypting the encrypted message using the device connected to the IoT

FIG. 6

SECURE BROADCAST FROM ONE TO MANY DEVICES

CLAIM OF PRIORITY

The present application is a national phase entry under 35 U.S.C. § 371 of International Application No. PCT/US2021/071776 filed Oct. 7, 2021, which claims priority from U.S. Provisional Application Ser. No. 63/090,189, filed on Oct. 10, 2020, and are hereby incorporated by reference herein in their entirety.

TECHNICAL FIELD

This invention relates to methods and apparatuses for configuring and controlling devices using one-way radio broadcasting.

BACKGROUND

Digital radio broadcasting technology delivers digital audio and data services to mobile, portable, and fixed receivers. One type of digital radio broadcasting, referred to as in-band on-channel (IBOC) radio broadcasting uses terrestrial transmitters in the existing Medium Frequency (MF) and Very High Frequency (VHF) radio bands. HD Radio™ technology, developed by iBiquity Digital Corporation, is one example of an IBOC implementation for digital radio broadcasting and reception. IBOC radio signals can be transmitted in a hybrid format including an analog modulated carrier in combination with a plurality of digitally modulated carriers. Digital Audio Broadcasting (DAB) or Digital Radio Mondiale (DRM) are digital-only formats where the analog modulated carrier is not used.

One feature of digital transmission systems is the ability to simultaneously transmit both digitized audio and data. Thus, the technology also allows for wireless data services from radio stations. The broadcast signals can include metadata, such as the artist, song title, or station call letters. Additionally, special messages about events, traffic, and weather can also be transmitted using the hybrid radio signals or digital-only radio signals. With specialized receivers, the hybrid or digital-only radio signals provide opportunities to send other types of messages, including messages to service end devices, such as devices included in an Internet of Things (IoT) for example.

SUMMARY

The technology presented in this document relates to a one-way radio communication transmission service that allows one or multiple client applications, or clients, to control one or many end devices using one or multiple radio broadcast stations. The embodiments described herein provide a backend radio system that provides messages to the radio broadcast stations which in turn transmit radio broadcast signals for one-way communication with the end devices to support processing, communication, or control of the end devices.

An example of a method of controlling operation of an end device using a one-way radio broadcast includes sending an encrypted message from a client application of a computing device to a first server included in a network cloud, sending the encrypted message from the first server to a second server included with radio broadcast automation equipment, transmitting the encrypted message in a radio broadcast signal using one or more radio broadcast transmitters, receiving the radio broadcast signal at the end device, and decrypting the encrypted message using the end device.

An example of a backend system includes a first server included in a network cloud, a second server included with radio broadcast automation equipment, wherein the second server is operatively coupled to one or more one-way radio broadcast transmitters, wherein the first server is configured to receive an encrypted message from a client application and send the encrypted message to the second server, and wherein the second server is configured to initiate transmission of the encrypted message in a radio broadcast signal to one or more end devices using the one or more radio broadcast transmitters.

This section is intended to provide a brief overview of subject matter of the present patent application. It is not intended to provide an exclusive or exhaustive explanation of the invention. The detailed description is included to provide further information about the present patent application such as a discussion of the dependent claims and the interrelation of the dependent and independent claims in addition to the statements made in this section.

BRIEF DESCRIPTION OF THE DRAWINGS

FIG. 4 is a functional block diagram of portions of an example of an Internet of things (IoT) device.

FIG. 6 is a flow diagram of a method of controlling operation of an IoT device.

DESCRIPTION

The following description describes various embodiments of methods and apparatuses that provide a one-way transmission service that allows one or multiple client applications (or clients) to target one or many radio broadcast stations. The one-way transmission service can be used by a client to control an end device, select end devices, or many end devices. An example of end devices is IoT devices. The client can use the transmission service to control IoT devices in a network included within a single radio broadcast region, or a network that is included in many radio broadcast regions.

The one-way transmission service allows for a client to control a targeted IoT device to perform tasks such as controlling the temperature of a water heater or turning on streetlights. Radio broadcast stations are targeted by the clients using a network cloud. The term "cloud" as used herein refers to a hardware abstraction. Instead of one dedicated server processing the IoT messages sent by a client application, the IoT messages can be sent to a data center or processing center that performs the processing described herein. The actual server used to process the IoT messages is interchangeable at the data center or processing center. The IoT messages are received by radio automation equipment of the radio broadcast stations which includes the control messages in a radio broadcast signal. The IoT devices include radio receivers that can receive, extract, and process the IoT messages.

Digital radio broadcasting signals can be transmitted in a hybrid format or extended hybrid format including an analog modulated carrier (e.g., frequency modulated or FM) in combination with a plurality of digitally modulated carriers, or in an all-digital format where an analog modulated carrier is not used. The control messages of the transmission service described herein, can be included in hybrid radio signals, or digital-only radio signals to broadcast the messages.

Figure 1:
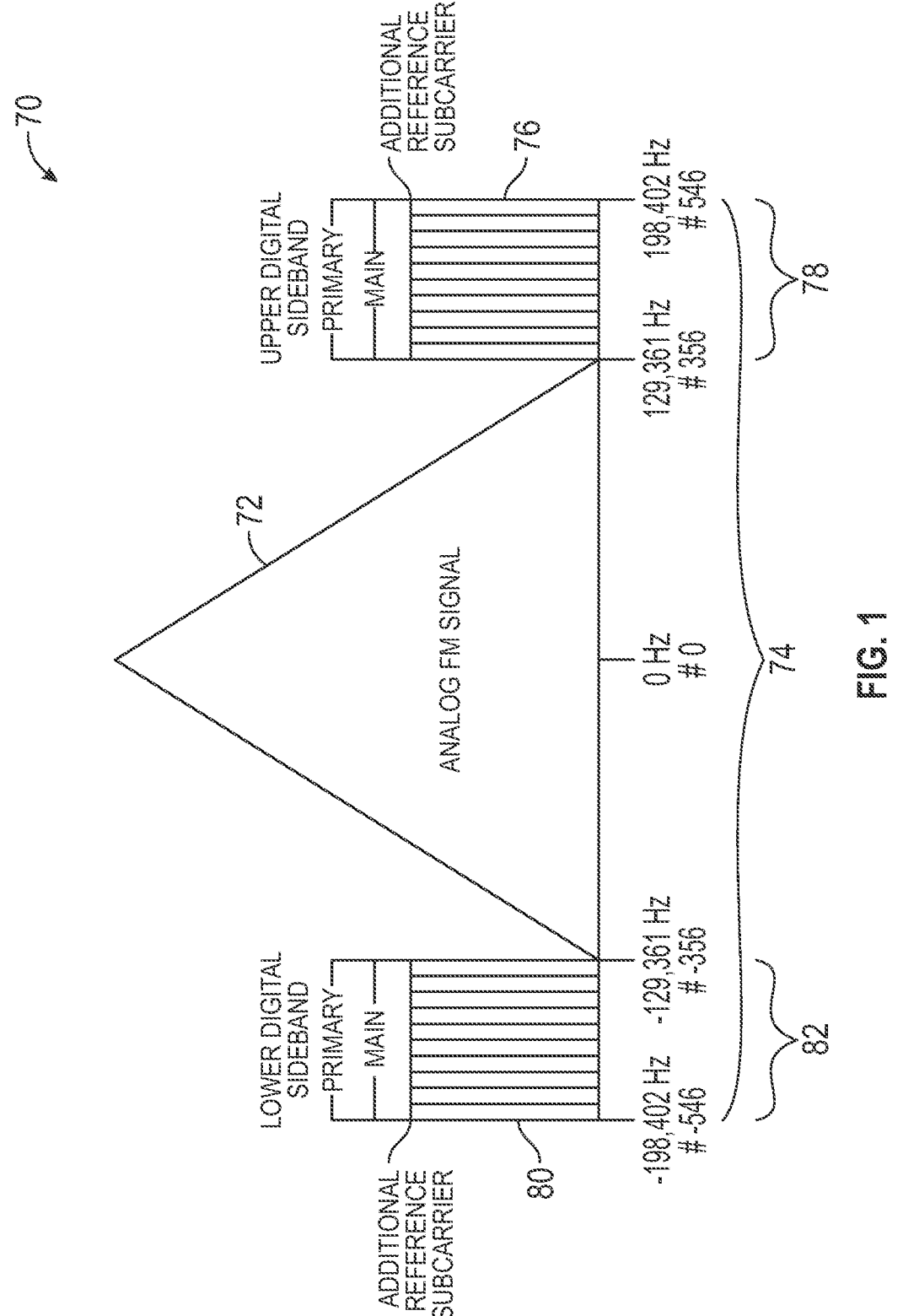
FIG. 1 is a schematic representation of a hybrid radio waveform.

FIG. 1 is a schematic representation of a hybrid frequency modulation (FM) in-band on-channel (IBOC) waveform 70. The waveform 70 includes an analog modulated signal 72 located in the center of a broadcast channel 74, a first plurality of evenly spaced orthogonally frequency division multiplexed subcarriers 76 in an upper sideband 78, and a second plurality of evenly spaced orthogonally frequency division multiplexed subcarriers 80 in a lower sideband 82. The digitally modulated subcarriers are divided into partitions and various subcarriers are designated as reference subcarriers. A frequency partition is a group of 19 orthogonal frequency division multiplexing (OFDM) subcarriers containing 18 data subcarriers and one reference subcarrier.

The hybrid waveform 70 includes an analog FM signal, plus digitally modulated primary main subcarriers. The subcarriers are located at evenly spaced frequency locations. The subcarrier locations are numbered from −546 to +546. In the waveform of FIG. 1, the subcarriers are at locations +356 to +546 and −356 to −546. Each primary main sideband is comprised of ten frequency partitions. Subcarriers 546 and −546, also included in the primary main sidebands, are additional reference subcarriers. The amplitude of each subcarrier can be scaled by an amplitude scale factor.

Figure 2:
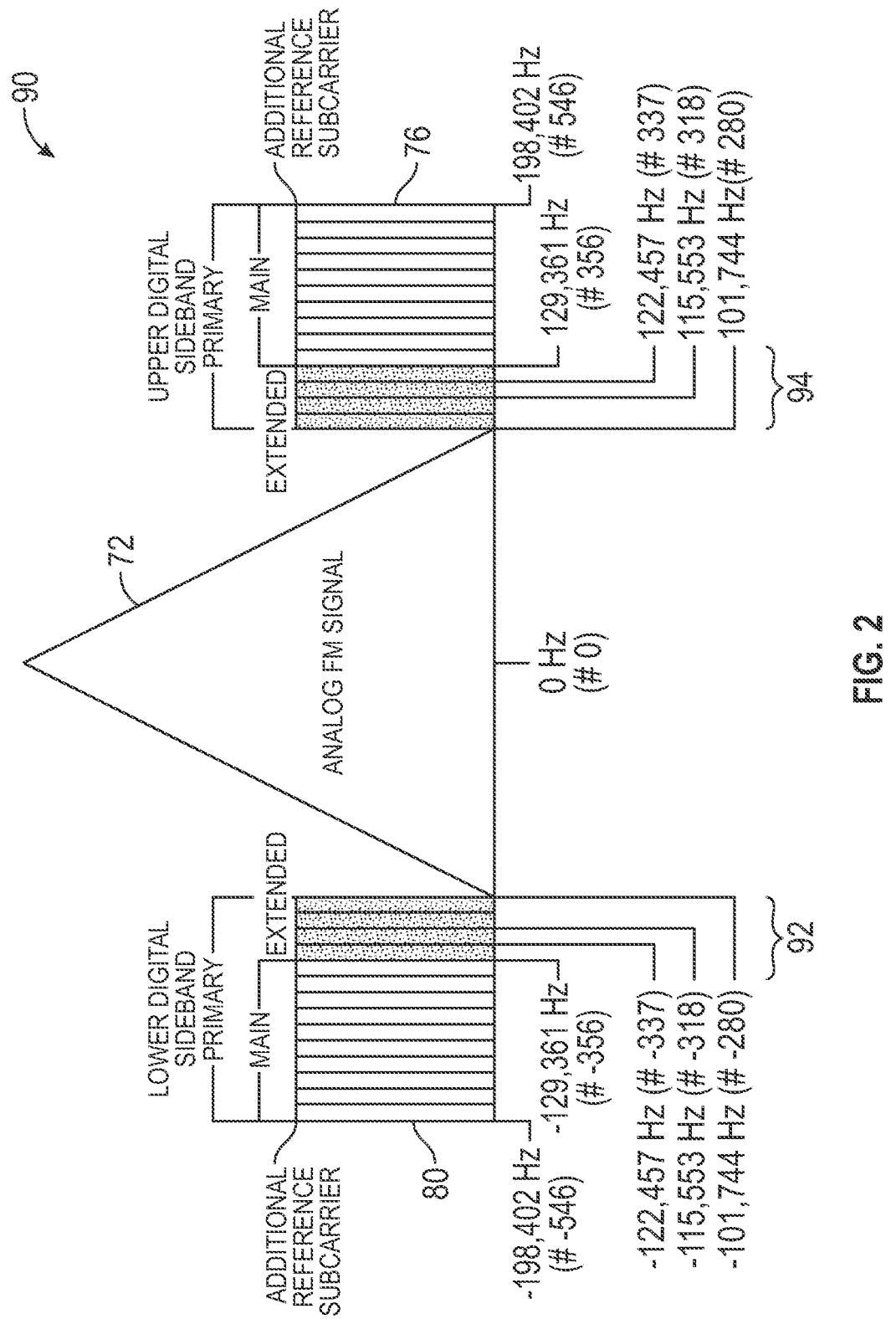
FIG. 2 is a schematic representation of an extended hybrid radio waveform.

FIG. 2 is a schematic representation of an extended hybrid FM IBOC waveform 90. The extended hybrid waveform 90 is created by adding primary extended sidebands 92, 94 to the primary main sidebands present in the hybrid waveform. One, two, or four frequency partitions can be added to the inner edge of each primary main sideband. The extended hybrid waveform includes the analog FM signal plus digitally modulated primary main subcarriers (subcarriers +356 to +546 and −356 to −546) and some or all primary extended subcarriers (subcarriers +280 to +355 and −280 to −355).

The upper primary extended sidebands include subcarriers 337 through 355 (one frequency partition), 318 through 355 (two frequency partitions), or 280 through 355 (four frequency partitions). The lower primary extended sidebands include subcarriers −337 through −355 (one frequency partition), −318 through −355 (two frequency partitions), or −280 through −355 (four frequency partitions). The amplitude of each subcarrier can be scaled by an amplitude scale factor.

Figure 3:
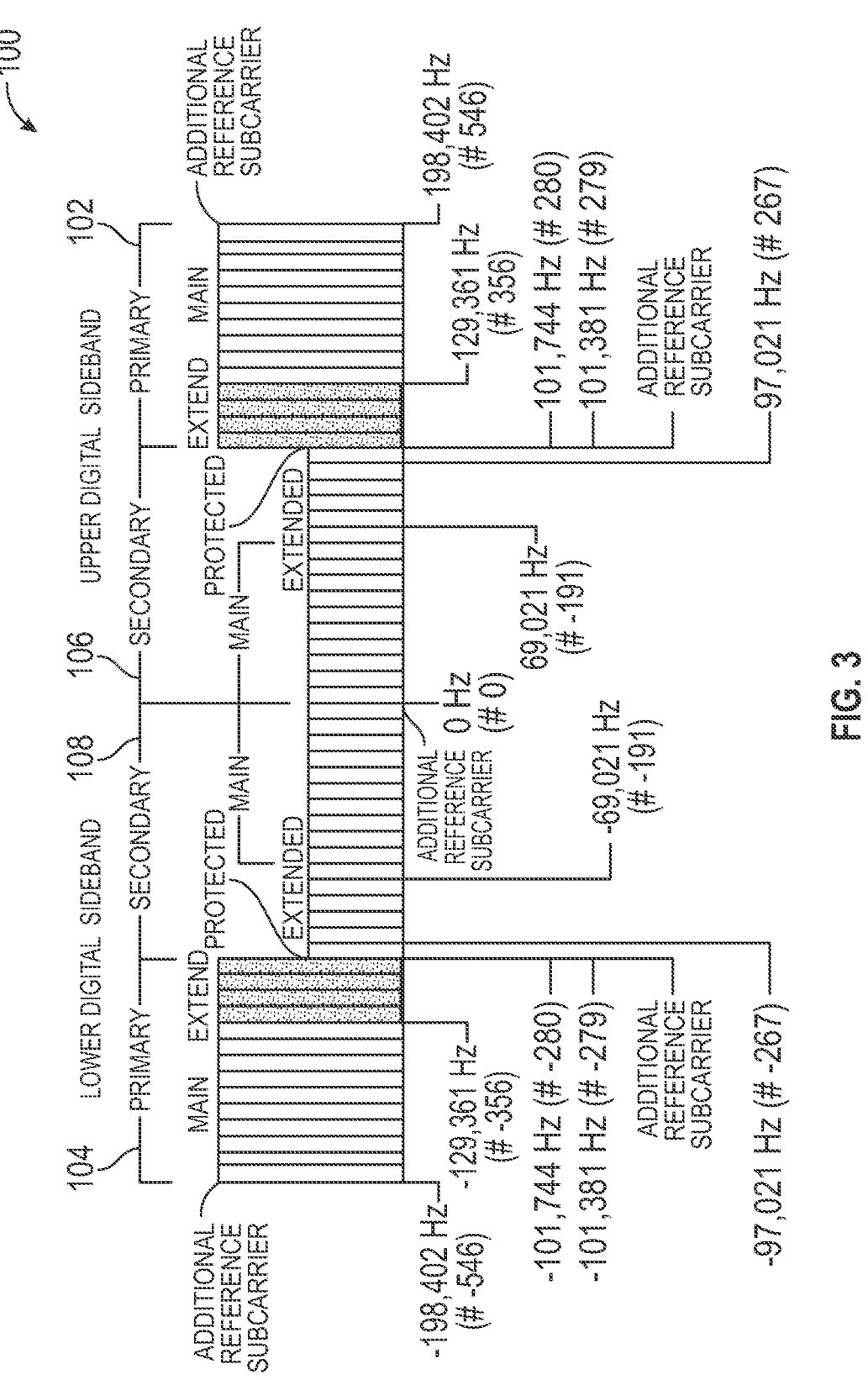
FIG. 3 is a schematic representation of an all-digital radio waveform.

FIG. 3 is a schematic representation of a digital-only FM DAB waveform 100. The digital-only waveform 100 is constructed by disabling the analog signal, fully expanding the bandwidth of the primary digital sidebands 102, 104, and adding lower-power secondary sidebands 106, 108 in the spectrum vacated by the analog signal. The all-digital waveform in the illustrated embodiment includes digitally modulated subcarriers at subcarrier locations −546 to +546, without an analog FM signal.

In addition to the ten main frequency partitions, all four extended frequency partitions are present in each primary sideband of the all-digital waveform. Each secondary sideband also has ten secondary main (SM) and four secondary extended (SX) frequency partitions. Unlike the primary sidebands, however, the secondary main frequency partitions are mapped nearer to the channel center with the extended frequency partitions farther from the center.

Each secondary sideband also supports a small secondary protected (SP) region 110, 112 including 12 OFDM subcarriers and reference subcarriers 279 and −279. The sidebands are referred to as "protected" because they are located in the area of spectrum least likely to be affected by analog or digital interference. An additional reference subcarrier is placed at the center of the channel (0). Frequency partition ordering of the SP region does not apply since the SP region does not contain frequency partitions.

Each secondary main sideband spans subcarriers 1 through 190 or −1 through −190. The upper secondary extended sideband includes subcarriers 191 through 266, and the upper secondary protected sideband includes subcarriers 267 through 278, plus additional reference subcarrier 279. The lower secondary extended sideband includes subcarriers −191 through −266, and the lower secondary protected sideband includes subcarriers −267 through −278, plus additional reference subcarrier −279. The total frequency span of the entire all-digital spectrum is 396,803 Hz. The amplitude of each subcarrier can be scaled by an amplitude scale factor. The secondary sideband amplitude scale factors can be user selectable. Any one of the four may be selected for application to the secondary sidebands.

In each of the waveforms, the digital signal is modulated using orthogonal frequency division multiplexing (OFDM). OFDM is a parallel modulation scheme in which the data stream modulates a large number of orthogonal subcarriers, which are transmitted simultaneously. OFDM is inherently flexible, readily allowing the mapping of logical channels to different groups of subcarriers.

In the hybrid waveform, the digital signal is transmitted in primary main (PM) sidebands on either side of the analog FM signal in the hybrid waveform. The power level of each sideband is appreciably below the total power in the analog FM signal. The analog signal may be monophonic or stereo and may include subsidiary communications authorization (SCA) channels. In the extended hybrid waveform, the bandwidth of the hybrid sidebands can be extended toward the analog FM signal to increase digital capacity. This additional spectrum, allocated to the inner edge of each primary main sideband, is termed the primary extended (PX) sideband. In the all-digital waveform, the analog signal is removed and the bandwidth of the primary digital sidebands is fully extended as in the extended hybrid waveform. In addition, this waveform allows lower-power digital secondary sidebands to be transmitted in the spectrum vacated by the analog FM signal. The sidebands of the waveforms provide opportunity to include IoT messages that can be received by IoT devices equipped with an appropriate receiver.

FIG. 4 is a block diagram of portions of an example of an IoT end device 450. The IoT device is the device to which the user wants to send data via the one-way transmission service. The IoT device 412 includes a receiver 414 and a host controller 418. The receiver 414 is able to receive a digital radio broadcast signal (e.g., a radio signal with any of the waveforms described in regard to FIGS. 1-3) transmitted by a radio broadcast transmitter 408. The receiver 414 is connected to an antenna and radio tuner circuitry. The receiver 414 may include a baseband processor to process the received radio signal as described herein. The receiver circuitry may be included in one or more integrated circuits. A received radio signal is provided to an analog-to-digital converter (ADC) and digital down converter to produce a baseband signal comprising a series of complex signal samples. The signal samples are complex in that each sample comprises a "real" component and an "imaginary" component, which is sampled in quadrature to the real component. For a hybrid or hybrid extended signal, an analog demodulator demodulates the analog modulated portion of the baseband signal to produce an analog signal. In some examples, the analog signal is an analog audio signal.

The digitally modulated portion of the sampled baseband signal is filtered by a sideband isolation filter to obtain a complex signal. The sideband isolation filter has a pass-band frequency response comprising a set of subcarriers $f_1$-$f_n$ present in the received OFDM signal. The complex signal is then demodulated to demodulate the digitally modulated portion of the baseband signal and the digital information in the radio signal is recovered. This digital information can include the IoT message sent from the client application. The received digital information can be sent to the host controller 418 and used to control the IoT device 412. The IoT message can include control data that changes the operation of the IoT device 412. For example, the IoT device 412 may update a control register with the control data to adjust operation of the IoT device 412.

Figure 5:
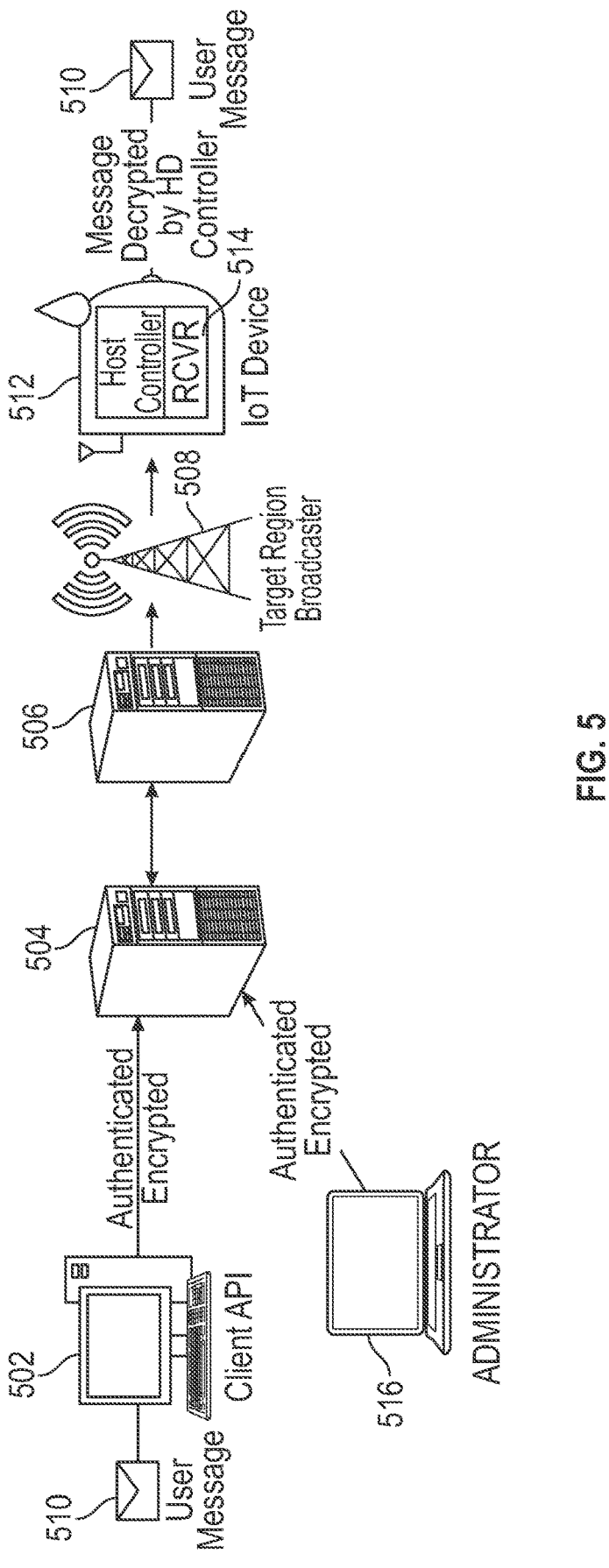
FIG. 5 is a block diagram of portions of an example of a backend system that provides a one-way transmission service to IoT devices.

FIG. 5 is a block diagram of portions of a backend system that provides a one-way transmission service to end devices. The end devices may be IoT devices connected to an IoT or any embodiment of IoT. The transmission service provided using the methods and devices described herein allow a user with a computing device that includes a client application program interface (API) and access to the Internet to send one-way data to an IoT device located in the region of a radio broadcast station broadcasting a digital radio signal. The backend system includes a network server 504 included in a network cloud (e.g., an IoT cloud), and radio broadcast automation equipment that includes a second server 506 and a radio broadcast transmitter 508. The server 506 of the radio broadcast automation equipment receives incoming messages from the IoT cloud server 504. When the messages are received, the server 506 schedules the messages for transmitting in a radio broadcast signal. The radio broadcast transmitter 508 includes a digital exciter to generate digital radio signals and may include an analog exciter to generate analog radio signals. The example in FIG. 5 illustrates the client application 502 using the backend system to send a message 510 to a IoT device 512.

FIG. 6 is a flow diagram of a method 600 of controlling operation of a device included in an IoT. The method 600 may be performed using the backend system of FIG. 5. At 605, a message 510 is received by the client application 502 and the client application 502 sends the message 510 to a server 504 included in the IoT cloud. The message 510 may be encrypted. The message 510 may be used to control an end IoT device 512 or to control multiple IoT devices. The interface between the client application 502 and the server 504 may be a secure channel that may be secured using authentication and encryption. The secure channel is in addition to any encryption of the message 510 performed by the user and the backend system may be agnostic to the contents of the message 510.

At 610, the message 510 is sent from the IoT cloud to a server 506 included in the radio broadcast automation equipment of a radio broadcast station. Other information may be sent in addition to the message 510 itself, such as scheduling information, geographical target information, etc. The interface between the IoT cloud server 504 and the radio broadcast station server 506 may be a secure channel. The network server 504 may schedule sending messages to the radio equipment server 506 over the secure channel. At 615, the message 510 is transmitted in a radio broadcast signal using the radio broadcast transmitter 508. The radio broadcast signal used to send the message 510 may be a hybrid radio signal, extended hybrid radio signal, or all-digital radio signal, and the message is transmitted using a digitally modulated subcarrier of the radio broadcast signal.

At 620, the message 510 is received by the target IoT device 512 that is located within the radio broadcast region of the radio broadcast station. The IoT device 512 includes a radio receiver 514 that can receive a digital radio broadcast signal such as a hybrid radio signal, extended hybrid radio signal, or all-digital radio signal, and the IoT devices recovers the message 510 from a digitally modulated subcarrier of the radio broadcast signal. If message 510 was sent using a secure channel, the IoT device decrypts the message to recover the user's original message which is used to control the IoT device. Any encryption by the secure channel is in addition to any encryption of the message 510 by the user. If the original message was a message encrypted by the user, the IoT device 512 decrypts the message 510 at 625.

Figure 7:
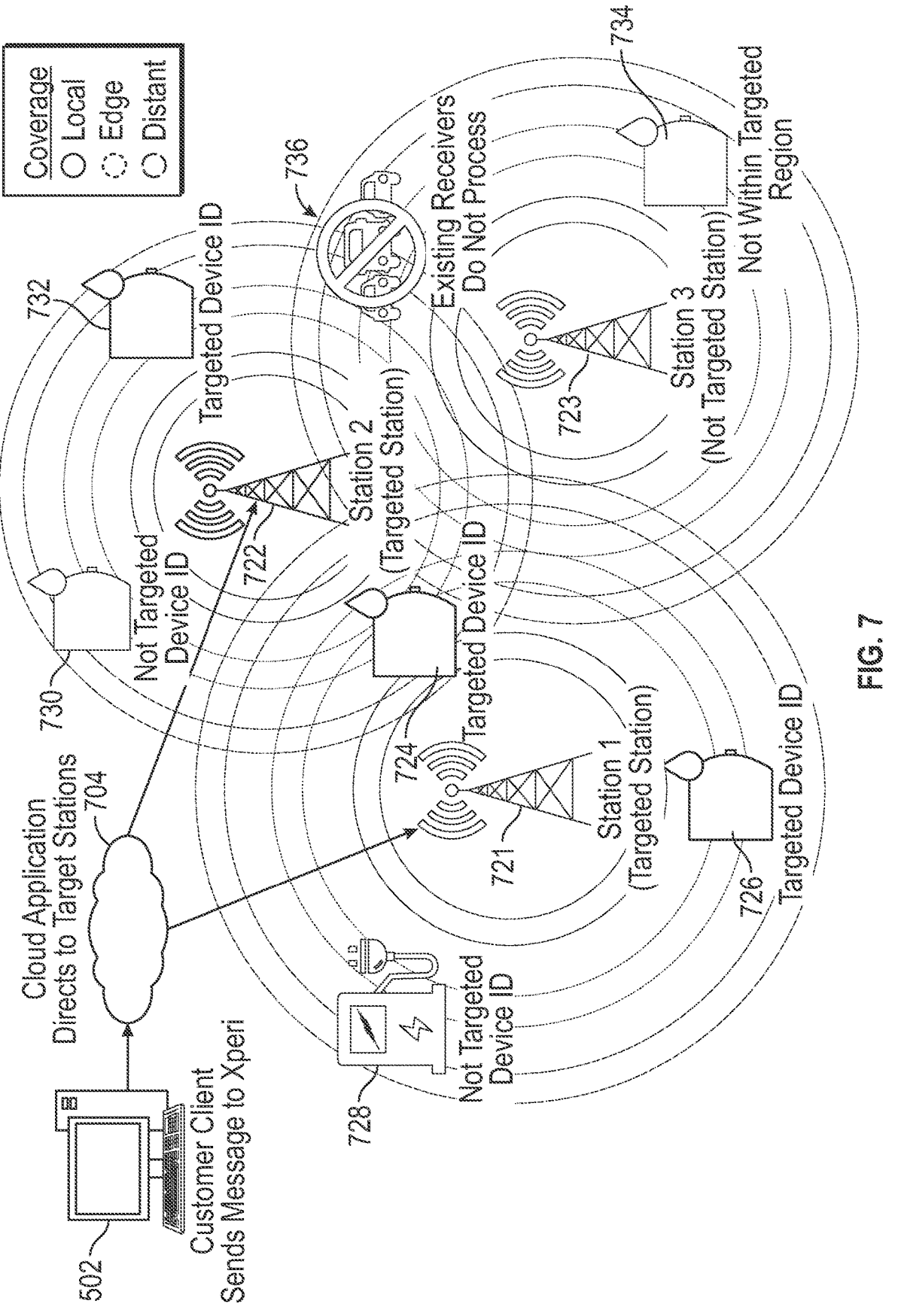
FIG. 7 is an illustration of an example of another system that provides a one-way transmission service to IoT devices.

FIG. 7 is an illustration of an example of another system 700 that provides a one-way transmission service to IoT devices. The example of FIG. 7 shows multiple radio broadcast stations (721, 722, 723) connected to an IoT cloud 704 as part of the backend of the system. The IoT cloud 704 uses the multiple radio stations to reach IoT devices that are in different radio broadcast regions of the radio broadcast stations. For example, radio broadcast station 721 can be used to transmit data to IoT devices 724, 726, 728, radio broadcast station 722 can be used to transmit data to IoT devices 724, 730, 732, and radio broadcast station 723 can be used to transmit data to IoT device 734.

The IoT cloud 704 can transmit an IoT message (e.g., a message that controls behavior of the IoT device) to all of the IoT devices by including the IoT message in radio broadcast signals of the signal broadcast by the radio broadcast stations (721, 722, 723). The IoT cloud 704 can also transmit an IoT message to only some of the IoT devices by including the IoT message only in the radio broadcast stations with broadcast regions that cover the IoT devices. For example, the IoT cloud 704 can send an IoT message only to IoT devices 724, 726, 728 by broadcasting the IoT message only using radio broadcast station 721. IoT devices 730, 732, 734 do not receive the IoT message. The IoT cloud 704 can also target specific devices in one or more broadcast regions so that the IoT message is received by less than all the IoT devices within the broadcast region of a radio station. The client application 502 may indicate a geographical target for the message. The geographical target can be a state, a zip code, a city or town, etc., or multiple states, zip codes, cities, towns, etc. Geographical targets specified by the client application 502 can be of different sizes. The IoT cloud 704 can transmit an IoT message to the IoT devices located in the geographical target by sending the IoT message only to the radio broadcast stations with broadcast regions that cover the geographical target.

In the example of FIG. 7, the IoT cloud 704 sends the IoT message to radio broadcast stations 721 and 722, but not to radio station 723 and IoT device 734 is not within a target region. The IoT cloud 407 targets IoT devices 724, 726, 732, and devices 728, 730 are not targeted. To target certain devices within a broadcast region, but not others, the IoT cloud 704 may include a device identifier (ID) in the IoT message and only the IoT device (or devices) with a matching ID process the IoT message in the radio broadcast signal for that region. This can be useful for a user to only target a particular device or a particular type of device in the broadcast region. The IoT device ID may be included early in the message (e.g., in the message header) to reduce time used by the radio receiver of an IoT device in processing a non-targeted message. In the example of FIG. 7, the IoT cloud 704 sends an IoT message to radio broadcast station 721 that includes an IoT device ID for IoT device 724. The IoT device ID may also correspond to IoT device 726, or the IoT cloud may send a separate message with an IoT device ID for IoT device 726. The IoT cloud sends an IoT message to radio broadcast station 722 to target IoT device 732. Note that IoT cloud 704 could also target IoT device 724 using radio broadcast station 722. Radio receivers 736 are not capable of processing IoT messages.

To make the IoT cloud 704 aware of the available radio broadcast stations, the radio stations are registered with the IoT cloud 704. Returning to FIG. 5, an administrator device 516 can register the radio broadcast stations with a server 504 of the IoT cloud to generate a radio broadcast station database containing the radio broadcast stations available to the IoT cloud for broadcasting IoT messages. The registered radio stations are presented to the user by the client application 502. The broadcast regions may be included with the presented radio station information. The client application 502 receives selections of radio broadcast stations for transmitting one or more IoT messages from the user to one or more end IoT devices. Administrators may also register client applications or rights of the owners of the client application to control access to the one-way messaging service.

Figure 8:
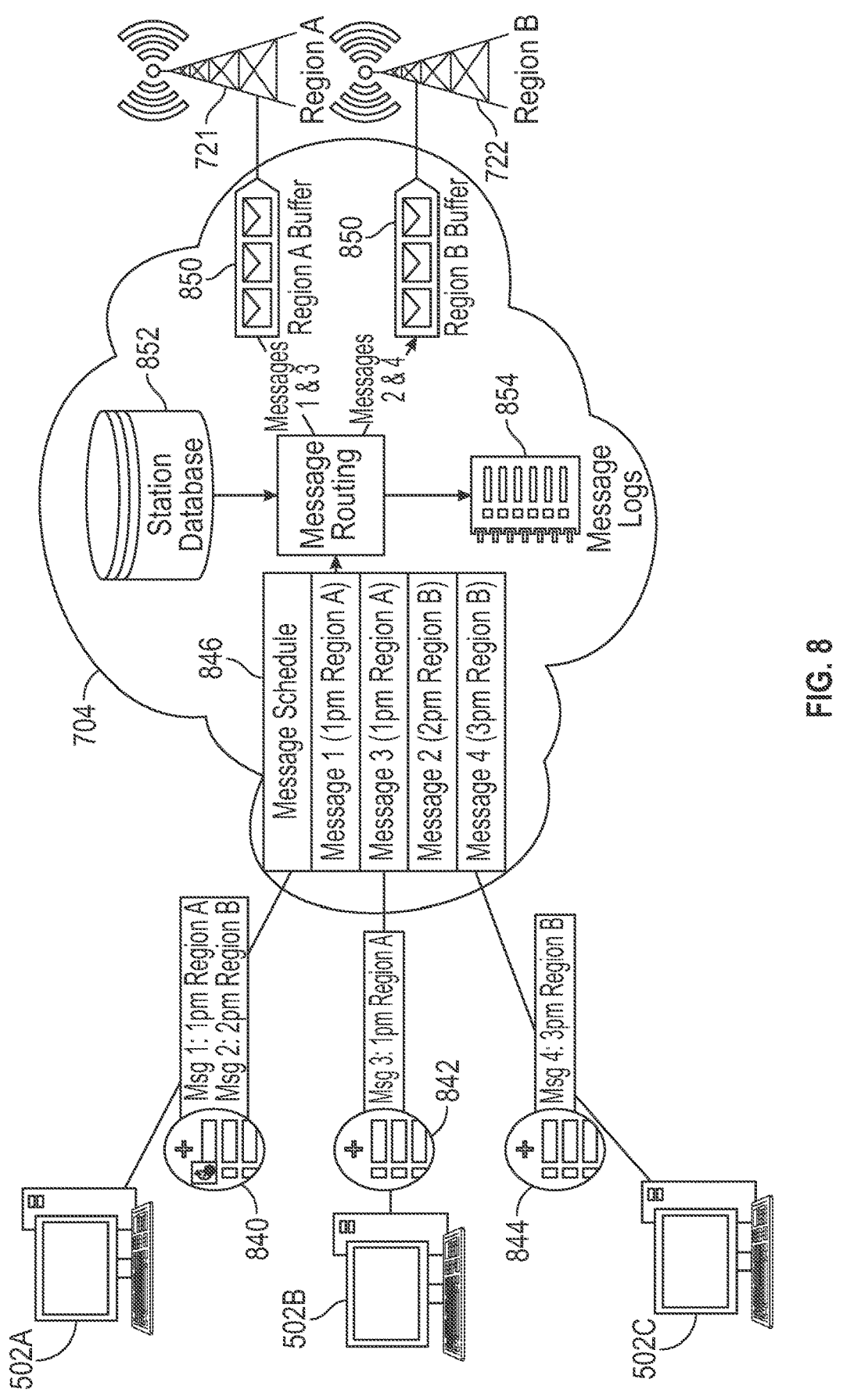
FIG. 8 is an illustration of an example of another system that provides a one-way transmission service to IoT devices.

FIG. 8 is an illustration of an example of another system that provides a one-way transmission service to IoT devices. The system includes multiple client applications 502A, 502B, 502C, and IoT cloud 704. The system also includes radio broadcast station transmitters 721 and 722. The client applications want to send IoT messages 840, 842, 844 to IoT devices in the broadcast regions of radio broadcast stations 721 and 722. To send the IoT messages, each client application sends its IoT messages to the IoT cloud 704 for servicing. A server of the IoT cloud 704 (e.g., server 504 in FIG. 5) determines a schedule 846 for the IoT messages. The IoT cloud 704 may route the IoT messages from the client applications to a radio broadcast station broadcasting to the corresponding regions indicated in the IoT messages. The IoT cloud 704 may include message buffers 850 to buffer the IoT messages before sending them to the radio broadcast stations according to the schedule for broadcasting at the scheduled time.

The IoT cloud 704 resolves conflicts in the scheduling. For example, in FIG. 8 both Message 1 and Message 3 both designate broadcasting in Region A at 1:00 PM. The IoT cloud 704 resolves conflict according to an algorithm (e.g., by priority) and stores the messages in the buffer accordingly. In some examples, the IoT cloud 704 searches the Radio Broadcast Station Database 852 to determine if another radio broadcast station is available to broadcast in Region A, and routes one of the conflicting messages to the other radio broadcast station if available. The IoT cloud 704 may store a message log 854 to record message transactions.

In some examples, the message log 854 can be read by a client application to confirm sending of the IoT messages.

The IoT messages 840, 842, 844 may have a standard format (e.g., the transmission control protocol (TCP) format, the user datagram protocol (UDP) format, and the like). The IoT messages 840, 842, 844 may be encrypted messages from the user. The IoT interface between the client applications 502A, 502B, 502C and the IoT cloud 704 may add another layer of encryption to the messages. The IoT messages 840, 842, 844 may have a payload that is delivered to the IoT device. In some examples, an IoT message can include at least a portion of a software upgrade for one or more the IoT devices. Using the one-way transmission service described herein allows a user to upgrade the software in many IoT devices at one time.

Figure 9:
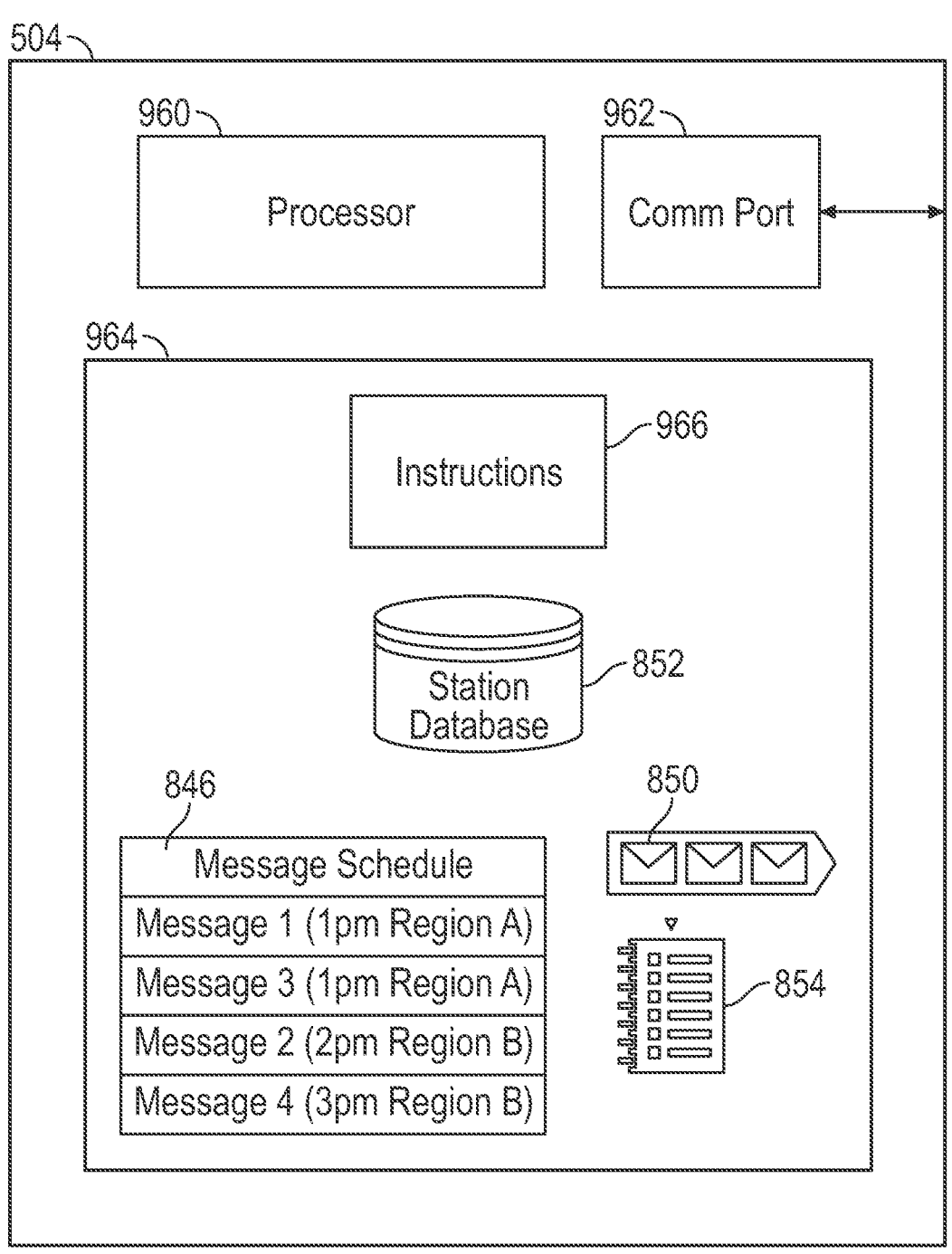
FIG. 9 is a block diagram of portions of an example of an IoT server.

FIG. 9 is a block diagram of portions of an example of an IoT server 504 that may be included in an IoT cloud. The server 504 includes at least one hardware processor 960 and a communication port 962 for connection to other servers in the IoT cloud (e.g., IoT cloud 704 of FIG. 7). The server 504 also includes a memory 964. The memory 964 stores instructions 966 that when executed by the processor 960 cause the server 504 to perform the server functions described herein.

The memory 964 may also store a radio broadcast station database 852 that lists registered radio broadcast stations that broadcast digital radio signals suitable for transmitting IoT messages. The database 852 with the registered radio stations may be received from a system administrator. The memory 846 may store a message schedule 846 and the processor forwards the messages to radio broadcast automation equipment of the radio broadcast stations. The memory 964 may include one or more buffers 850 to buffer IoT messages received from client applications. The memory 964 may store a message log 854. While the radio broadcast station database 852, message schedule 846, buffer 850, and message log 854 are shown in one server, they may be distributed over more than one server of the IoT cloud.

Figure 10:
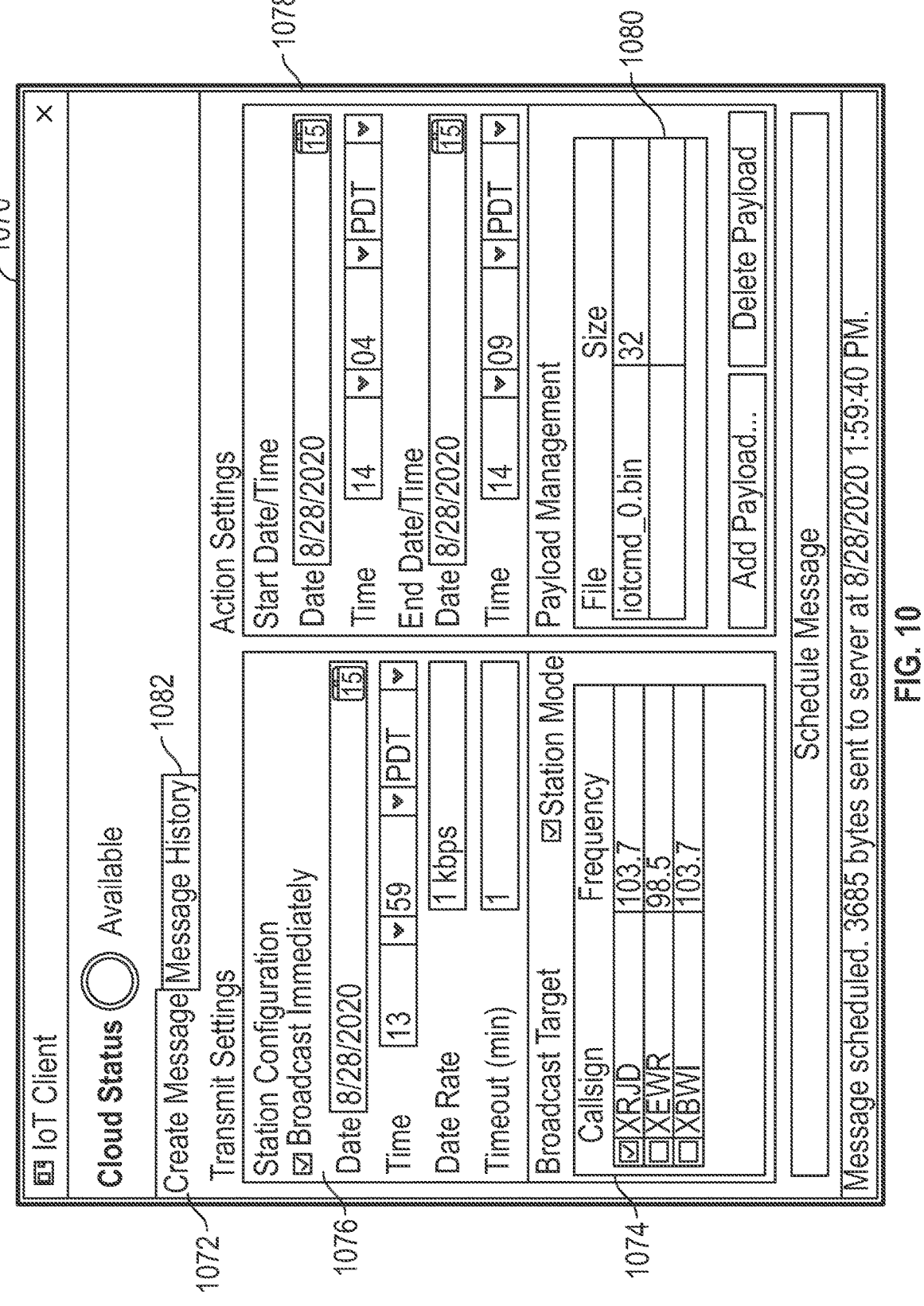
FIG. 10 is an example of a graphical user interface for a client application of a one-way transmission service.

FIG. 10 is an example of a graphical user interface (GUI) for a client application of a one-way transmission service (e.g., client application 502 in FIG. 5). The client application sends IoT messages to the IoT cloud for transmission service to one or more IoT end devices. The GUI 1070 can include a create message tab 1072 for managing IoT messages. The GUI 1070 can include a broadcast target field 1074 that indicates the radio broadcast stations targeted for the IoT message. The radio broadcast stations may be selected from a list of available radio broadcast stations provided by the IoT cloud. Alternatively, the target for the IoT message may be listed as geographical regions, and the IoT cloud determines the appropriate radio broadcast stations for transmitting the IoT message. In another example, IoT end devices are indicated as the target and the IoT cloud determines the appropriate radio broadcast stations for transmitting the IoT message.

The GUI 1070 can include a station configuration field 1076 for configuring the transmission from the radio broadcast station. The GUI 1070 can include a Date/Time field 1078 for specifying the broadcast timing requirements of the IoT message. The GUI 1070 can include a payload management field 1080 for configuring the payload of the IoT message. The payload is the information the user wants to deliver to the end IoT devices or devices to control the operation of the device. The payload may be encrypted by the user. The GUI can include a message history tab 1082 that can be used to display past messages sent by the user and the status of those messages.

The methods, systems and devices described herein provide the ability for a user with an internet connection to send one-way data services to IoT devices anywhere the appropriate digital broadcast radio is available and supported. The one-way data transmission can target a wide range of IoT devices at once or can target one specific IoT device. The number of devices targeted, or the type of devices targeted, may make the one-way transmission service a better option to service IoT devices than conventional Wi-Fi approaches.

Additional Disclosure and Examples

Example 1 includes subject matter (such as a method of controlling operation of an end device using a one-way radio broadcast) comprising sending an encrypted message from a client application of a computing device to a first network server. The encrypted message includes control information to control operation of an end device. The method further includes sending the encrypted message from the first network server to a second server included with radio broadcast automation equipment, transmitting the encrypted message in a radio broadcast signal using one or more radio broadcast transmitters, receiving the radio broadcast signal at the end device, and loading the control information in the end device.

In Example 2, the subject matter of Example 1, optionally includes transmitting the encrypted message in a digitally modulated subcarrier of the radio broadcast signal.

In Example 3, the subject matter of one or both of Examples 1 and 2 optionally includes receiving the radio broadcast signal at an end device connected to the IoT and decrypting the encrypted message using the end device connected to the IoT.

In Example 4, the subject matter of one or any combination of Examples 1-3 optionally includes establishing a secure channel between the client application and the first network server and establishing a secure channel between the first network server and the second server of the radio broadcast automation equipment.

In Example 5, the subject matter of one or any combination of Examples 1-4 optionally includes receiving encrypted messages from multiple client applications at the first network server, scheduling, by the first network server, sending of the encrypted messages to radio broadcast automation equipment of multiple radio broadcast stations, and sending, by the first network server, the encrypted messages according to the scheduling.

In Example 6, the subject matter of one or any combination of Examples 1-5 optionally includes receiving, by the first network server, registration of a radio broadcast station associated with the radio broadcast automation equipment, and identifying the registered radio broadcast station as a message destination to the client application.

In Example 7, the subject matter of one or any combination of Examples 1-6 optionally includes presenting, by the client application, one or more registered radio broadcast stations to a user, and receiving, by the client application, a selection of one or more radio broadcast stations for transmitting the encrypted message.

In Example 8, the subject matter of one or any combination of Examples 1-7 optionally includes sending an encrypted message that includes an identifier of an end device connected to the IoT and decrypting the encrypted message using the device connected to the IoT when the identifier is a match for the device connected to the IoT.

In Example 9, the subject matter of one or any combination of Examples 1-8 optionally includes sending a software update from the first network server to the second server included with the radio broadcast automation equipment, transmitting the software update in the radio broadcast signal, and receiving the radio broadcast signal at the end device connected to an IoT and extracting the software update from the radio broadcast signal using the end device connected to the IoT.

In Example 10, the subject matter of one or any combination of Examples 1-9 optionally includes the first network server being included in an Internet of Things (IoT) cloud and the end device being an IoT device.

Example 11 includes subject matter (such as a backend system that provides a one-way data transmission service) or can optionally be combined with one or any combination of Examples 1-10 to include such subject matter, comprising a first server included in a network cloud, a second server included with radio broadcast automation equipment, wherein the second server is operatively coupled to one or more one-way radio broadcast transmitters, wherein the first server is configured to receive an encrypted message from a client application and send the encrypted message to the second server, and wherein the second server is configured to initiate transmission of the encrypted message in a radio broadcast signal to one or more end devices using the one or more radio broadcast transmitters, wherein the encrypted message includes control information to control operation of the one or more end devices.

In Example 12, the subject matter of Example 11 optionally includes the second server configured to include the encrypted message in a digitally modulated subcarrier of the radio broadcast signal.

In Example 13, the subject matter of one or both of Examples 11 and 12 optionally includes the first network server configured to establish a secure channel with the client application and establish a secure channel with the second server of the radio broadcast automation equipment.

In Example 14, the subject matter of one or any combination of Examples 11-13 optionally includes the first network server configured to receive encrypted messages from multiple client applications, schedule sending of the encrypted messages to radio broadcast automation equipment of multiple radio broadcast stations and send the encrypted messages according to the schedule.

In Example 15, the subject matter of one or any combination of Examples 11-14 optionally includes the first network server configured to receive registration of a radio broadcast station associated with the radio broadcast automation equipment and identify the registered radio broadcast station as a message destination to the client application.

In Example 16, the subject matter of one or any combination of Examples 11-15 optionally includes the first network server configured to identify one or more registered radio broadcast stations to the client application and receive an indication from the client application of one or more of the registered radio broadcast stations for transmitting the encrypted message.

In Example 17, the subject matter of one or any combination of Examples 11-16 optionally includes the first network server configured to send control data for the one or more end devices to the second server included with the radio broadcast automation equipment, and the second server configured to initiate transmission of the control data in a radio broadcast signal to the one or more end devices using the one or more radio broadcast transmitters.

In Example 18, the subject matter of one or any combination of Examples 11-17 optionally includes an Internet of Things (IoT). The one or more end devices are connected to the IoT, and the one or more end devices are configured to receive the radio broadcast signal and decrypt the encrypted message included in the radio broadcast signal.

In Example 19, the subject matter of Example 18 optionally includes the first network server being included in a network cloud and configured to encode the encrypted message to include an identifier of the end device connected to the IoT, and the end device is configured to decrypt the encrypted message when the identifier is a match for the end device.

In Example 20, the subject matter of one or any combination of Examples 11-19 optionally includes the first network server configured to receive geographical target information from the client application and select radio broadcast stations for transmitting the encrypted control information according to the geographical target information.

These non-limiting examples can be combined in any combination or permutation. The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. In the above Detailed Description, various features may be grouped together to streamline the disclosure. This should not be interpreted as intending that an unclaimed disclosed feature is essential to any claim. Rather, the subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope should be determined with reference to the appended claims, along with the full scope of equivalents to which such claims are entitled.

What is claimed is:

1. A method of controlling operation of an end device using a one-way radio broadcast, the method comprising:
sending an encrypted message and geographical target information from a client application of a computing device to a first network server, wherein the encrypted message includes control information to control operation of an end device;
sending the encrypted message and the geographical target information from the first network server to a second server included with radio broadcast automation equipment, wherein the second server is operatively coupled to a plurality of one-way radio broadcast transmitters;
commanding, by the first network server, the second server to select, one or more of the plurality of one-way radio broadcast transmitters that have broadcast regions that correspond with the geographical target information;
transmitting the encrypted message from the second server only to the selected one or more of the plurality of one-way radio broadcast transmitters; and
transmitting, by the one or more of the plurality of one-way radio broadcast transmitters, the encrypted message in a radio broadcast signal to the end device;
wherein sending the encrypted message includes sending an encrypted message that includes an identifier of the end device, the identifier identifying the particular end device; and
wherein the first network server is included in an Internet of Things (IoT) cloud and the end device is an IoT device.

2. The method of claim 1, wherein transmitting the encrypted message in a radio broadcast signal includes transmitting the encrypted message in a digitally modulated subcarrier of the radio broadcast signal.

3. The method of claim 1, further comprising transmitting the radio broadcast signal at an end device connected to the IoT.

4. The method of claim 1, including:
establishing a secure channel between the client application and the first network server, wherein the first server is included in a network cloud; and
establishing a secure channel between the first network server and the second server of the radio broadcast automation equipment.

5. The method of claim 1, including:
receiving encrypted messages from multiple client applications at the first network server;
scheduling, by the first network server, sending of the encrypted messages to radio broadcast automation equipment of multiple radio broadcast stations; and
sending, by the first network server, the encrypted messages according to the scheduling.

6. The method of claim 1, including:
receiving, by the first network server, registration of a radio broadcast station associated with the radio broadcast automation equipment; and
identifying the registered radio broadcast station as a message destination to the client application.

7. The method of claim 6, including:

presenting, by the client application, one or more registered radio broadcast stations to a user; and receiving, by the client application, a selection of one or more radio broadcast stations for transmitting the encrypted message.

8. The method of claim 1, wherein the geographical target is a state, a zip code, a city, or multiple states, multiple zip codes, or multiple cities.

9. The method of claim 1, including:

sending a software update from the first network server to the second server included with the radio broadcast automation equipment; and transmitting the software update in the radio broadcast signal to the end device connected to an Internet of Things (IoT).

10. The method of claim 1, wherein the decrypted message includes control data that changes the operation of the IoT device.

11. A backend system that provides a one-way data transmission service, the system comprising:

a first network server;

a second server included with radio broadcast automation equipment, wherein the second server is operatively coupled to a plurality of one-way radio broadcast transmitters;

wherein the first network server is configured to receive an encrypted message and geographical target information from a client application and send the encrypted message and the geographical target information to the second server;

wherein the first network server is further configured to command the second server to select one or more of the plurality of one-way radio broadcast transmitters that have broadcast regions that correspond with the geographical target information;

wherein the first network server is included in an Internet of Things (IoT) network cloud and is further configured to encode the encrypted message to include an identifier of one end device, the identifier identifying the particular one end device;

wherein the second server is configured to initiate transmission of the encrypted message with the control information in a radio broadcast signal to the one end device using the selected one or more one-way radio broadcast transmitters, wherein the encrypted message includes control information to control operation of the one end device;

wherein the identifier allows the one end device to decrypt the encrypted message when the identifier is a match for the respective end device; and wherein the one end device is an IoT device.

12. The system of claim 11, wherein the second server is configured to include the encrypted message in a digitally modulated subcarrier of the radio broadcast signal.

13. The system of claim 11, wherein the first network server is configured to:

establish a secure channel with the client application; and establish a secure channel with the second server of the radio broadcast automation equipment.

14. The system of claim 11, wherein the first network server is configured to:

receive encrypted messages from multiple client applications;

schedule sending of the encrypted messages to radio broadcast automation equipment of multiple radio broadcast stations; and send the encrypted messages according to the schedule.

15. The system of claim 11, wherein the first network server is configured to:

receive registration of a radio broadcast station associated with the radio broadcast automation equipment; and identify the registered radio broadcast station as a message destination to the client application.

16. The system of claim 11, wherein the first network server is configured to:

identify one or more registered radio broadcast stations to the client application; and receive an indication from the client application of one or more of the registered radio broadcast stations for transmitting the encrypted message.

17. The system of claim 11, wherein the first network server is included in a network cloud and is configured to send a software update for the one or more end devices to the second server included with the radio broadcast automation equipment; and wherein the second server is configured to initiate transmission of the software update in a radio broadcast signal to the one or more end devices using the one or more radio broadcast transmitters.

18. The system of claim 11, including:

an Internet of Things (IoT);

wherein the one or more end devices are connected to the IoT;

wherein the one or more end devices are configured to receive the radio broadcast signal and decrypt the encrypted message included in the radio broadcast signal.

19. The system of claim 18, wherein the end device is configured to decrypt the encrypted message when the identifier is a match for the end device.

20. The system of claim 11, wherein the geographical target is a state, a zip code, a city, or multiple states, multiple zip codes, or multiple cities.

21. The system of claim 11, wherein the decrypted message includes control data that changes the operation of the IoT device.

\* \* \* \* \*